(12) United States Patent
Jaworski

(10) Patent No.: US 7,007,209 B2
(45) Date of Patent: Feb. 28, 2006

(54) SYSTEM OF TESTING THE UPSTREAM CABLE MODEM CHANNEL

(76) Inventor: Richard Charles Jaworski, 260 Stoney Ridge Dr., Alpharetta, GA (US) 30022

(*) Notice: Subject to any disclaimer, the term of this patent is extended or adjusted under 35 U.S.C. 154(b) by 671 days.

(21) Appl. No.: 10/083,749

(22) Filed: Feb. 25, 2002

(65) Prior Publication Data
US 2003/0163772 A1 Aug. 28, 2003

(51) Int. Cl.
G01R 31/28 (2006.01)
(52) U.S. Cl. .................................. 714/716
(58) Field of Classification Search ............ 714/704, 714/705, 712, 746, 748, 750, 758, 716
See application file for complete search history.

(56) References Cited

U.S. PATENT DOCUMENTS

| | | |
|---|---|---|
| 5,477,531 A | 12/1995 | McKee et al. |
| 6,424,632 B1 | 7/2002 | Poret et al. |
| 6,512,747 B1 * | 1/2003 | Umeuchi et al. ........ 370/310.1 |
| 6,643,818 B1 * | 11/2003 | Valk ............................ 714/776 |

FOREIGN PATENT DOCUMENTS

EP 1 204 240 A2 6/2001

* cited by examiner

Primary Examiner—Albert Decady
Assistant Examiner—James Kerveros

(57) ABSTRACT

A method for testing the upstream channel of a cable modem system, using a tester, which generates and transmits a known test pattern to the Cable Modem Termination System (CMTS). If there are errors in the packet resulting from the upstream channel, the CMTS discards the packet based on standard Internet Protocol. If there are no errors the packet is returned on the downstream channel to the tester. The tester counts all returned test packets received including test packets with errors resulting in the downstream. Packets with errors are not discarded, but are checked for a portion of the repeating test pattern and checked for the correct number of bits of a test packet. All packets determined to be test packets, including those with errors, are counted over a period of time and compared to the number of packets originally sent.

13 Claims, 6 Drawing Sheets

SYSTEM OF TESTING THE UPSTREAM CABLE MODEM CHANNEL

CROSS-REFERENCE TO RELATED APPLICATIONS

Application Ser. No. 09/704,888, System and Method for Testing the Upstream Channel of a Cable Network, inventor Richard C. Jaworski et al. filed Nov. 1, 2000 describes an approach to testing the upstream channel. The present invention describes another approach with significant advantages over the testing method described in the referenced application.

BACKGROUND OF THE INVENTION

With the advent of the Internet and the desire for high speed Internet access at homes and businesses, cable television networks that were originally designed to distribute television signals are now being used to provide high speed Internet access and other services. The service to provide high speed Internet and data access over cable networks is commonly known as Cable Modem service. Cable Modem service has become the leading method of providing high-speed data access to consumers in the United States. Later embodiments of Cable Modem service also can include Telephony service and other Non-Internet related services as well using the same infrastructure.

FIG. 1 shows a typical cable modem implementation in a cable network. A device known as the Cable Modem Termination System (CMTS) 10 is the device at the central office or head end that communicates with all of the cable modems in the network that reside at subscriber homes and businesses. The CMTS 10 acts as an interface between the Internet backbone 12 and the Hybrid Fiber Coax (HFC) network 18. The Internet backbone 12 is well known in the art and is comprised of routers, coaxial and fiber optic communications lines. The CMTS 10 connects to the HFC network 18 through a combiner/splitter 14 where the signal from the CMTS 10 is combined with the television signals 16 to be carried on the HFC network to subscribers homes 22. The bi-directional HFC network 18 is comprised of fiber optic and coaxial lines and their associated equipment. Bi-directional HFC networks 18 are well known in the art and allow signals to be carried in the direction towards the subscriber or downstream, and the direction from the subscriber or upstream. In alternate embodiments of HFC Networks 18, coaxial only, or fiber only networks may be used.

A plurality of subscriber's homes 22 is connected to the HFC network by means of coaxial cable 22. Alternatively businesses may be connected to the network instead of homes via coaxial cable 22. FIG. 2 shows the connection from the HFC network 18 to the cable modem 28 and television 26. At the subscriber's home 22 the cable modem 28 and television 26 are connected to the coaxial cable 20 through a splitter 24. This arrangement of a coaxial cable 20 and splitter 24 is well known in the art. It is also well known to the art that this coaxial cable 20 connection with the HFC network 18 is bi-directional and can carry signals both in the downstream and upstream directions. The cable modem 28 is connected to the computer 30 to provide it with network access. All subscriber homes 22 have this basic connection to the television 26, the cable modem 28 and the computer 30 and the various embodiments of this basic design include multiple televisions 26 and/or multiple cable modems 28 and computers 30.

The CMTS 10 communicates with the cable modem 28 on the downstream using a digital channel on the HFC Network 18. This channel is shared by many cable modems in the area. Data for individual cable modems is time multiplexed with other cable modems on single channel. Each cable modem on the network monitors the data on the channel and picks off the data appropriate for that modem.

The upstream channel on the HFC Network 18 from the subscriber's cable modem 28 to the CMTS 10 is also shared by all of the modems in the area. Each cable modem 28 must take turns transmitting its data to the CMTS 10 based on a schedule that has been transmitted on the downstream from the CMTS 10. Unlike the forward channel signal, upstream data packets are not multiplexed with signals from other cable modems and the entire packet payload comprises data from a single cable modem.

Upstream channels on cable networks are susceptible to noise and interference known as ingress due to the inherent funneling effect of the HFC upstream. The effects of noise and ingress on the upstream in HFC networks 18 is well known to the art. This noise and interference in the upstream can have negative affects on the quality of data transmitted on the upstream. These negative affects manifest themselves on data traffic as data errors and can cause a partial or complete disruption of service.

Improving the performance of the upstream channel on cable networks has become imperative. With this need has come a corresponding need to test the performance of the upstream channel. There are limited ways to test the upstream channel to ensure its performance. In addition some of these methods have disadvantages as they require multiple test sets in both the field and at the CMTS or they are inaccurate under conditions of downstream errors. There is a need for a device and methods that can effectively test the upstream channel without the need for multiple test sets and without the limitations imposed by errors on the downstream that affect other test methods.

One approach currently in use to measure the upstream performance utilizes an instrument with a built in cable modem. This approach is described more fully in application Ser. No. 09/704,888. The instrument connects to the CMTS like a subscriber's modem and sends a ping packet to the CMTS. The CMTS after determining this is a ping packet, immediately returns the packet back to the instrument on the downstream. Packets that are lost in transmission are counted and a block error rate is displayed. This method requires that the downstream be free of errors in time interval when the measurement is being made and relies on the Forward Error Correction, (FEC) to determine if errors exist in the downstream. The use of FEC to determine if the errors are on the upstream or downstream is key to the claims of this invention. If errors exist on the downstream using this method, then upstream measurement results during the period of errors are discarded. The problem with this technique is that errors on the downstream channel can mask problems on the upstream and give an indication that no problems exist on the upstream, even when they actually are occurring. There is a need for a measurement technique that doesn't depend so heavily on an error free downstream channel to provide accurate measurement of the upstream.

BRIEF SUMMARY OF THE INVENTION

It is the objective of this invention to provide a system and method for testing the upstream channel of cable modem services on a cable network. It is the further objective of this invention to make the measurement of the upstream channel without disabling the network during testing. It is the her objective of this invention to provide a system and method for testing the upstream channel that does not require a second test device at the CMTS or other location. Finally, it is the objective of this patent to be able to determine that problems detected are a result of the upstream channel and not the downstream channel and not have errors in the downstream negatively affect measurement accuracy of the upstream channel.

The present invention utilizes the Cyclic Redundancy Check (CRC) facility built into the Internet Protocol of data transmission to provide a novel system and method for testing the upstream channel of cable modem services on a cable network. CRC is well known in the art. In its most basic form, the present invention provides a tester that comprises of a packet generator, addresser, bidirectional modem and measurement algorithm. A device within the Internet, usually the CMTS is selected by the addresser which receives the signal from the packet generator in the tester that generates a unique repeating sequence of data sent from bidirectional modem in the tester. The CMTS immediately returns the packet if no errors are detected in the CRC check done in the CMTS as called for by Internet Protocol (IP). At the tester the bidirectional modem receives and processes the incoming packet. Methods such as forward error correction (FEC) and other means that well known to the art are employed to process the signal. The returned packet is inspected to determine if the unique repeating sequence of data is included in the packet. If it has the correct number of bits and any portion of the repeating test sequence of data, the packet is counted in the measurement as a good packet, even if the CRC would have discarded this packet due to bit errors. Lack of receipt of the test packet is counted as a packet lost in the upstream and the measurement results are calculated. Usually this measurement is Block Error Rate (BkER) or lost packets.

In the normal embodiment of IP transmission any packets that contain errors detected by the CRC in the modem are immediately discarded. These packets must then be retransmitted. In this invention before these packets are discarded by the CRC check in the tester's modem, they are inspected for all or a portion of the unique pattern generated by the packet generator. They are also inspected for the number of bits contained in the test packet. If all or a significant part of the data bits in the packet match the unique pattern generated by the pattern generator and the packet contains the correct number of bits, then the packet will not be discarded and is included in the measurement results. This process of including packets normally discarded by the CRC in the measurement removes errors caused by the downstream in the measurement. The packet would not exist at all in the downstream if it had been discarded during the CRC check of CMTS. Packets that are not returned by the CMTS, must have been caused by errors in the upstream path and are counted in the measurement as lost packets and used to calculate other parameters such as BkER.

Using packets normally discarded by the CRC to identify if errors are caused in the downstream has significant advantages over previous methods of using the FEC as described in invention application Ser. No. 09/704,888. Data packets used for testing comprise a very small percentage of the total data received by the modem. Most of the data received by the modem was destined for other modems in the area since all share the channel. Using FEC as a means of determining if the packets are lost in the downstream, can add significant errors to the measurement results since the errors detected by the FEC may have manifested themselves in packets not used for testing or destined for other cable modems. Using the FEC method, during this interval of errors detected by the FEC on the downstream channel, any lost packets in the upstream are not counted in the measurement, potentially adding significant measurement error. In this invention all test packets will be counted during periods of downstream errors, even if the errors impact the test packets themselves. In this invention the test packets are not discarded by the test modem's CRC so they could not have been lost in the downstream path and any missing packets must have been discarded by the CRC check in the CMTS as a result of errors in the upstream. Thus this invention results in significantly higher accuracy in the upstream measurement during periods of downstream errors, when compared to the approach using FEC described in application Ser. No. 09/704,888.

DETAILED DESCRIPTION OF THE INVENTION

Figure 1:
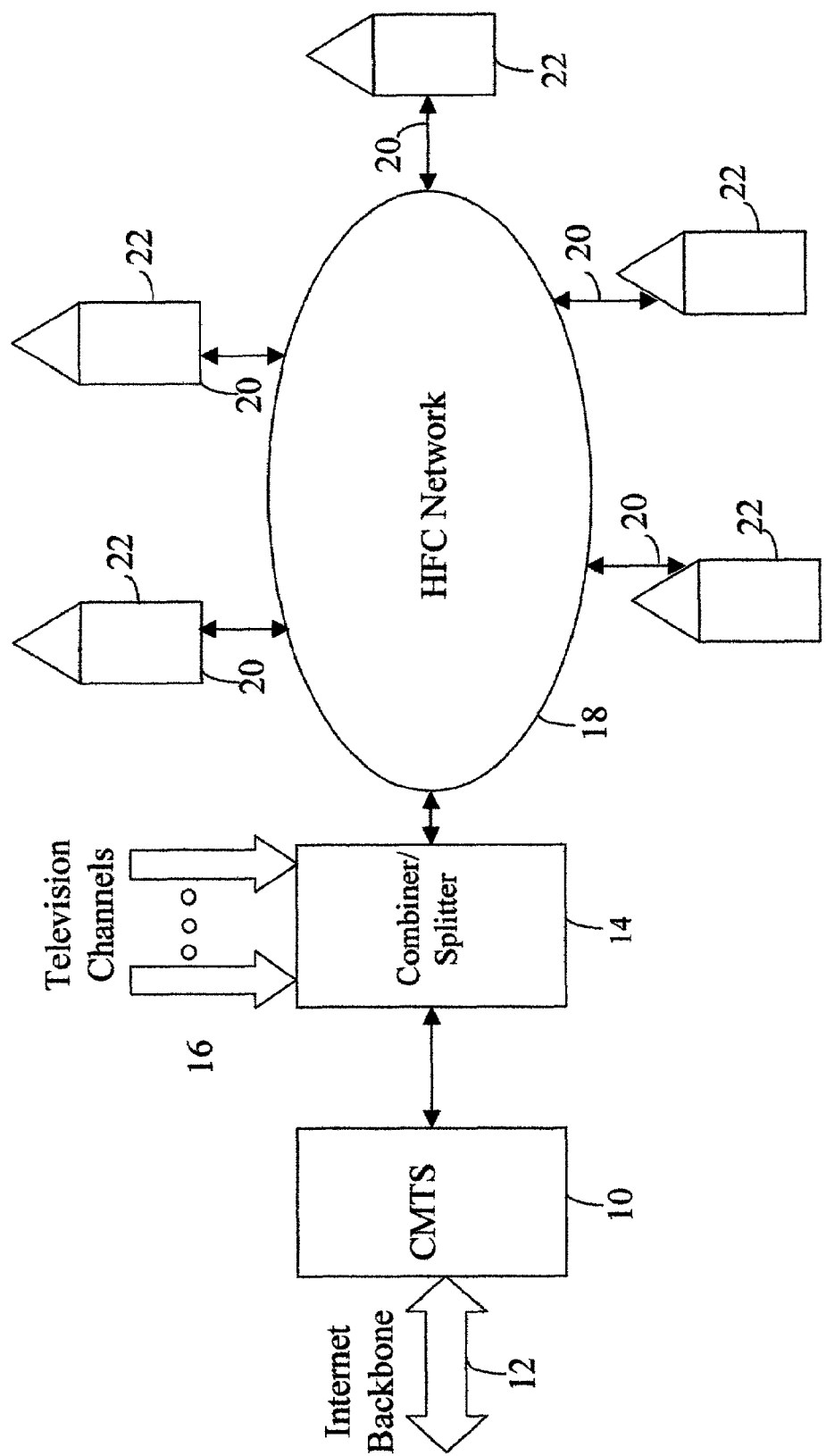
FIG. 1 is a block diagram of a conventional Hybrid Fiber Coax (HFC) cable network.
Figure 2:
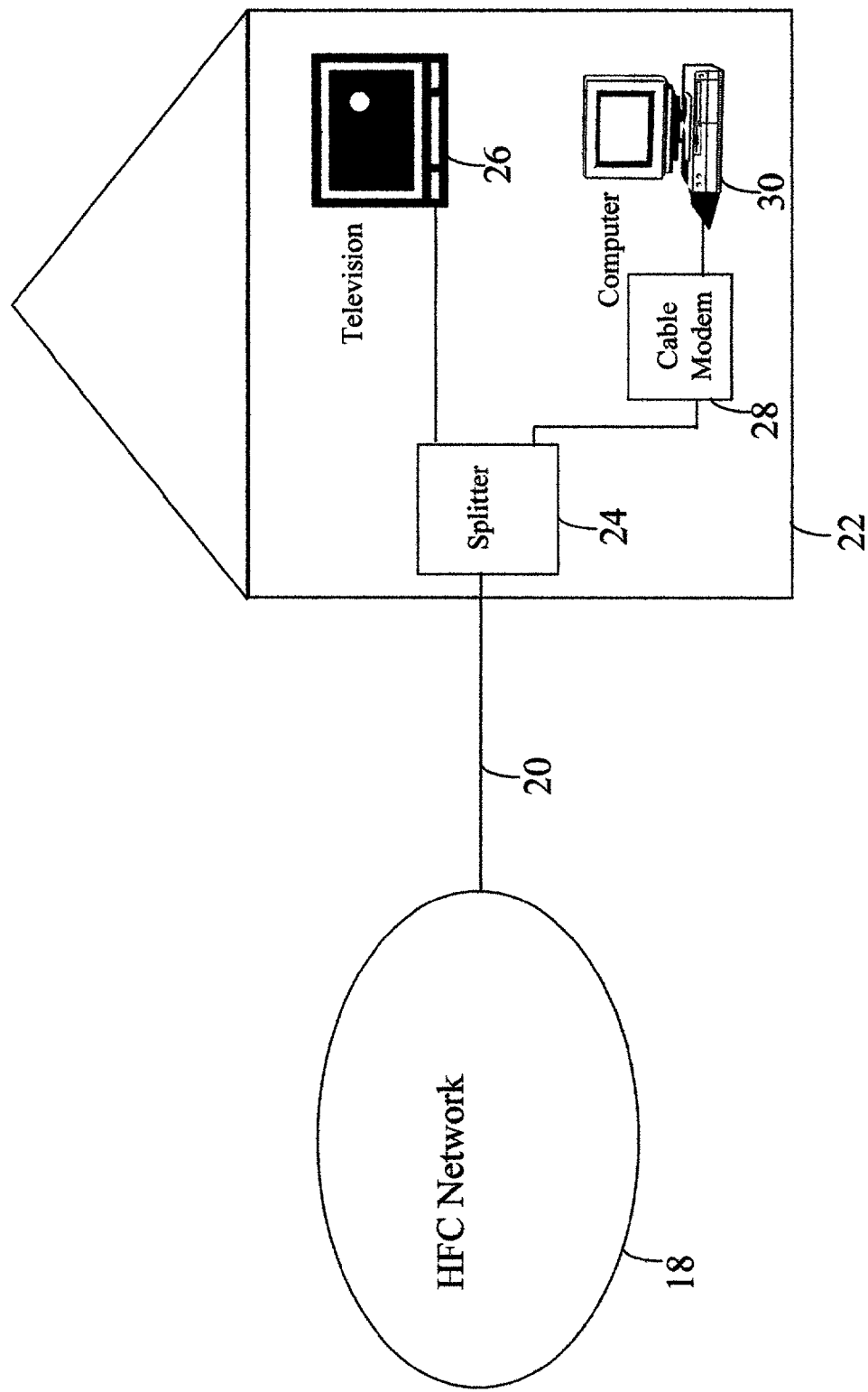
FIG. 2 is a block diagram of the connections of a cable subscriber's television and computer to the HFC network.
Figure 3:
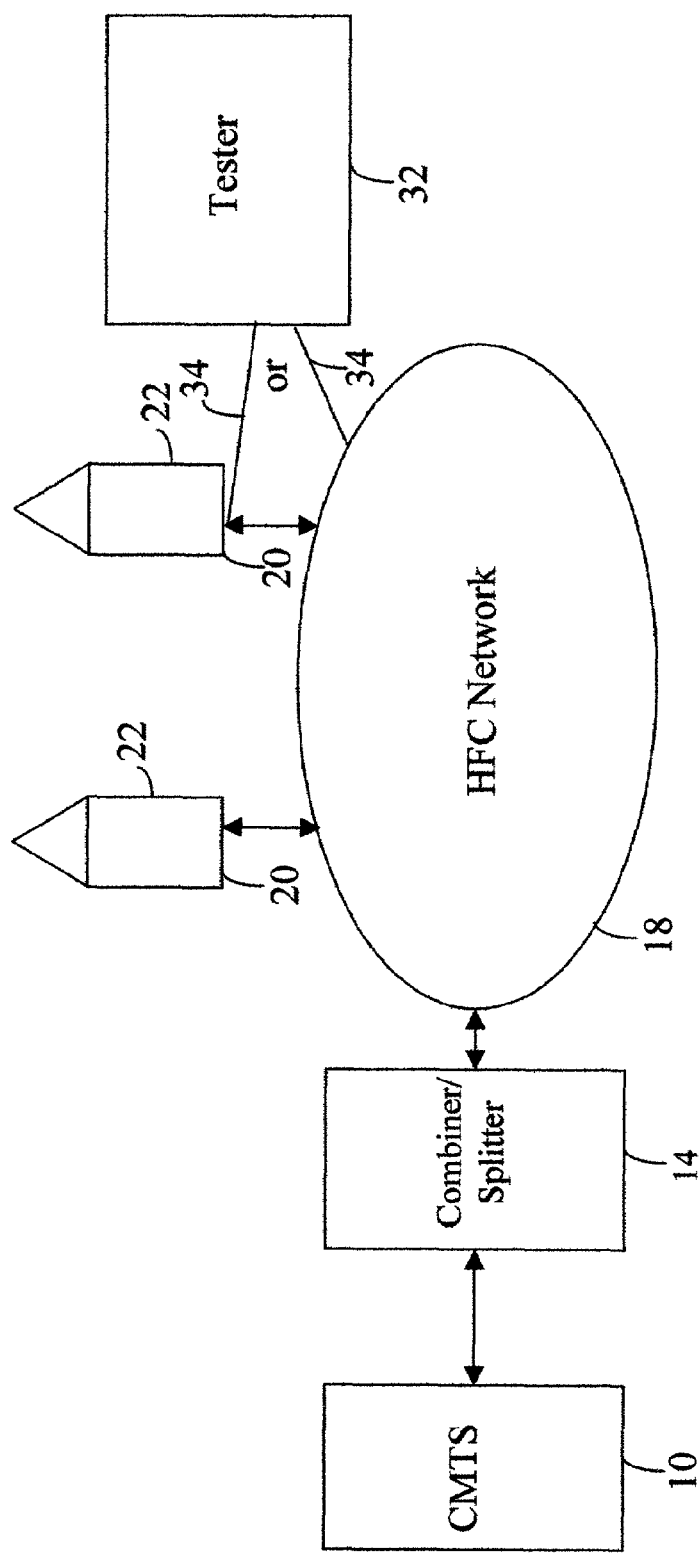
FIG. 3 is a block diagram of typical locations where a tester according to the present invention could make the test in a cable network.

Referring to FIG. 3, a tester 32 according to the present invention is shown coupled through a test cable 34 to either HFC Network 18 or coaxial cable 20. These are examples of where the tester can connect as it can be connected at almost any point in the coaxial portion of the HFC network or any of the coaxial connections inside subscriber's home 22. Tester 32 will test the upstream channel without disrupting other traffic on the upstream channel.

Figure 4:
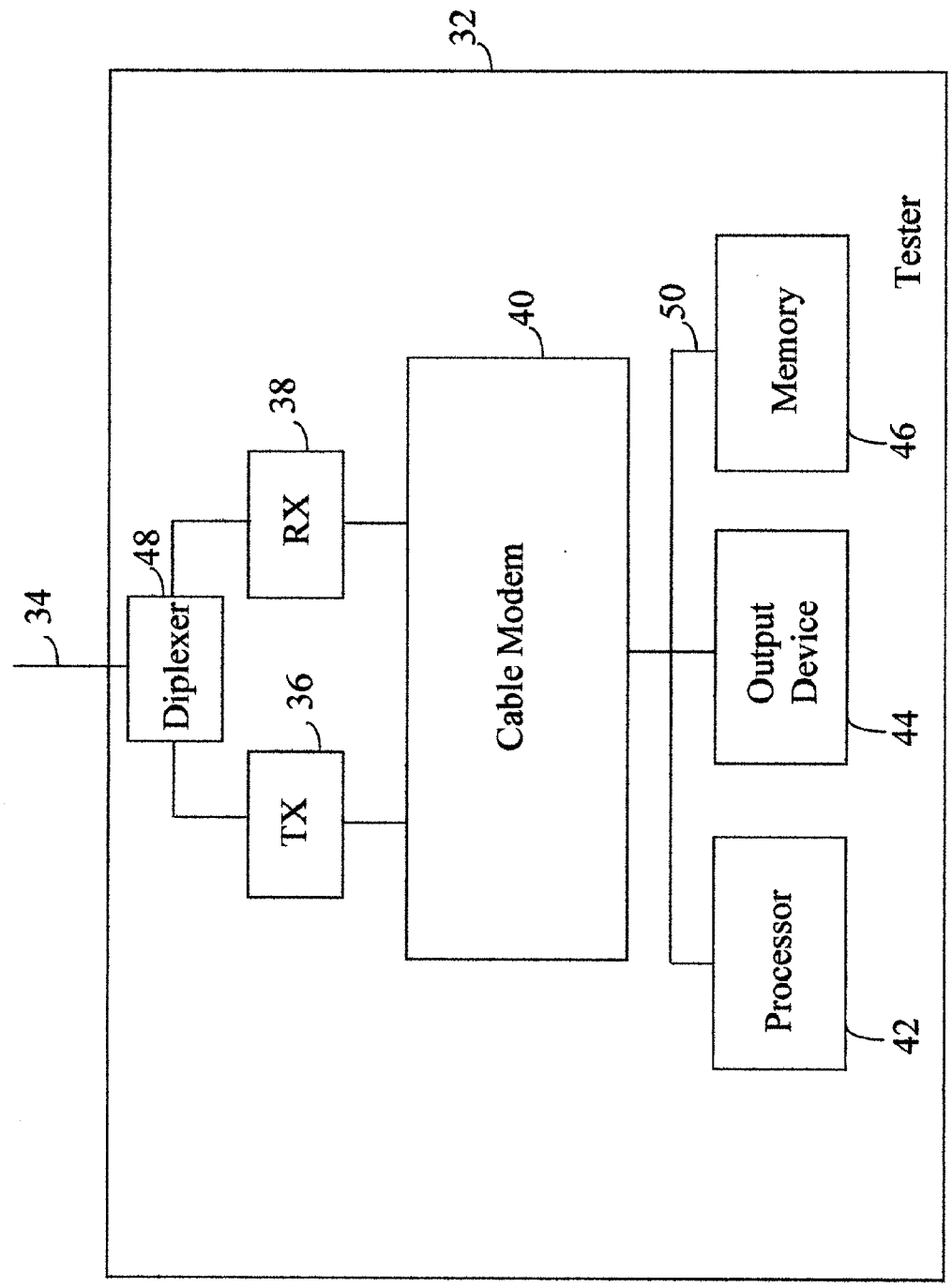
FIG. 4 is a block diagram of a tester according to the present invention.

Referring to FIG. 4 a detailed view of the embodiment of Tester 32 is shown. Tester 32 comprises a cable modem 40, a processor 42, a memory 46, an output device 44, a bus 50, a transmit port 36, a receive port 38, and a diplexer 48. While FIG. 4 is a typical embodiment of Tester 32, those of ordinary skill in the art will recognize that Tester 32 can be embodied in other components such as field programmable gate arrays, application specific integrated circuits and other components.

Memory 46 is uniquely programmed with instructions that when executed by processor 42 will implement the present invention. In some embodiments processor 42 may be co-located with cable modem 40 in the same component. According to the present invention, cable modem 40 will include capability for Cyclic Redundancy Check (CRC). CRC techniques are well known in the art.

Figure 5:
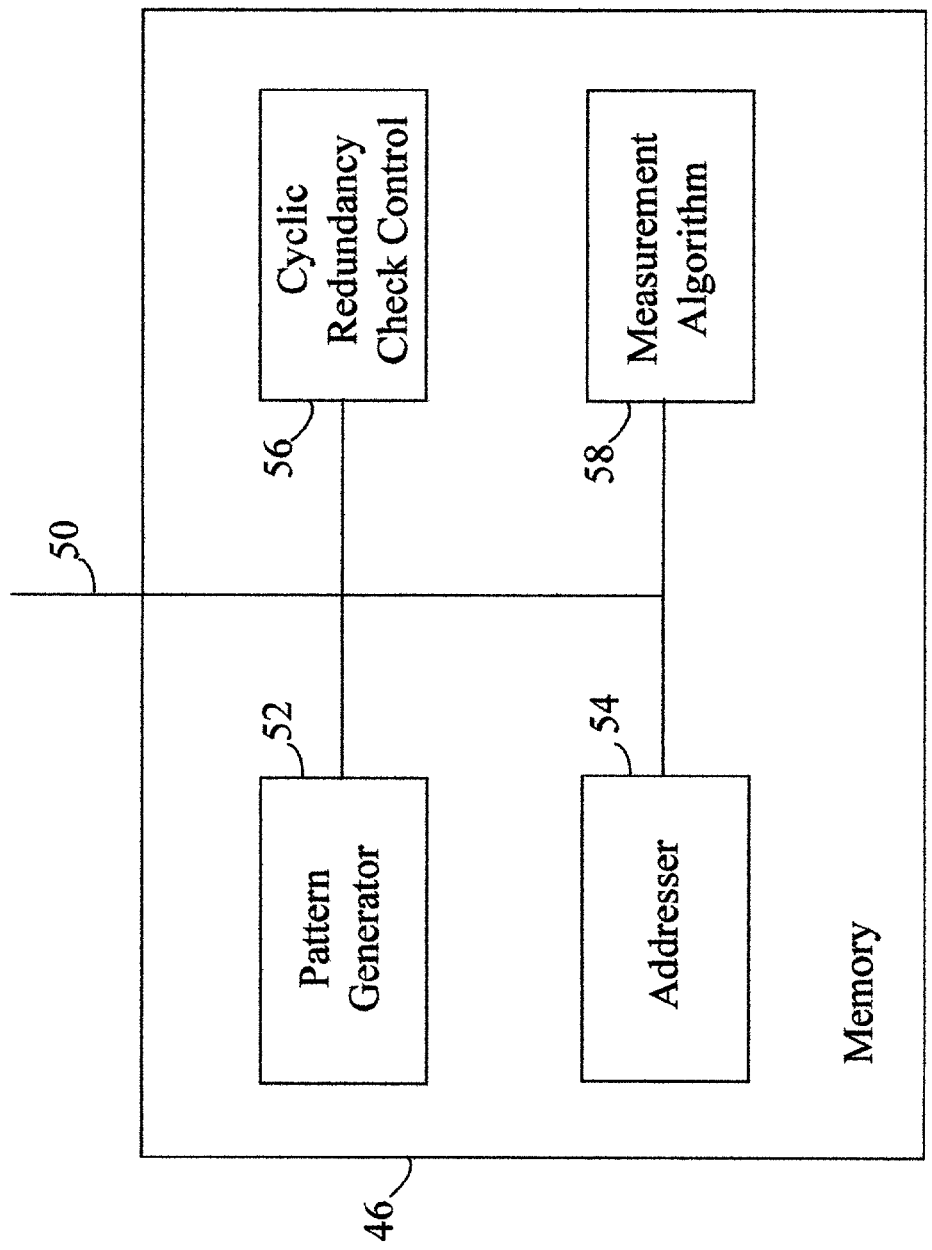
FIG. 5 is a block diagram of the memory of a tester according to the present invention.

Referring to FIG. 5, a block diagram of memory 46 is shown. Memory 46 comprises a pattern generator 52, an addresser 54, and a cyclic redundancy check control 56 and measurement algorithm 58. Those in the ordinary skill in the art will understand that pattern generator 52, addresser 54, cyclic redundancy check control 56 and measurement algorithm 58 are sections of memory 46 that hold program instruction steps that when executed by processor 42 and cable modem 40 carry out the functions of the devices. The cyclic redundancy check control 56 controls either the cable modem 40 or processor 42 to enable packets that are determined to be test packets not to be discarded, should they contain errors, but be observed to be test packets.

Pattern generator 52 generates a test signal for transmission in the upstream channel. Preferably the pattern generator generates a unique test pattern in a packet of the smallest packet size allowed. Preferably the size of the pattern should be significantly smaller than the size of the packet and repeated multiple times inside the packet. This repeating of the pattern will aid in the identification of the packet as a test packet when it is returned, should it contain errors. Addresser 54 prepares the test packet for transmission and addresses the packet to the IP address of the CMTS 10. The cable modem 40 is aware of the IP address of the CMTS, as this was needed for the cable modem 40 to register with the CMTS. It is preferable to address the packets to the CMTS 10 however the addresser 54 may address the packet to other destinations deeper in the network. Addresser 54 also includes an instruction in the test packet to return the test packet back to the cable modem 40 once it has been received by the CMTS 10.

When the CMTS 10 receives the test packet from Tester 32 it checks the packet for errors using CRC. If the CRC facility in CMTS 10 determines that errors exist in the packet, the packet is discarded and not returned to the Tester 32. Those in ordinary skill of the art will understand that IP protocol calls for discarding of packets determined to have errors at every router in the network, and CMTS 10 is considered to be a router in the IP network. If no errors are detected by CMTS 10, then the packet is returned to Tester 32.

Tester 32 receives the packet in cable modem 40. Normally all packets are checked using the CRC in the cable modem 40 and packets are discarded if errors are detected. This is the same operation that happened in CMTS 10 and is standard 1P protocol, since a cable modem 10 is considered a router. In this invention another step is taken and the packet is checked by the cyclic redundancy check control 56 before it is discarded by the CRC in the cable modem 40. Cyclic redundancy check control 56 counts the number of bits in the packet. If the number of bits in the packet containing errors matches the number of bits in a test packet, then the packet is not discarded in cable modem 40. Instead cyclic redundancy check control 56, observes the data contained in the packet. If the data in the packet matches some or the entire repeating pattern that was originally generated by pattern generator 52, then the cyclic redundancy check control 56 will pass the packet to measurement algorithm 58 where measurement results are calculated. Measurement algorithm 58 compares the number of packets originally generated by pattern generator 52 with the number it receives back and from this information calculates the measurement result. Typical measurement results generated by measurement algorithm 58 are Block Error Rate (BkER) and Lost Packets.

In another embodiment of this invention the CRC check in Cable Modem 40 is completely disabled from discarding errored packets during the time upstream measurements are being made. This is not the ideal approach since the tester 40 may also allow connection to a Personal Computer (PC) simultaneous to the measurement and with the CRC check disabled, some errored packets unrelated to the measurement could be passed to the PC.

The preferred embodiment of the system of the present invention is as incorporated in a Cable Modem Application Specific Integrated Circuit (ASIC). Cable modem ASICs are available from Broadcom Corporation of Irvine, Calif. and other manufacturers. Some cable modem ASICs are provided with basic cable modem functionality along with means to program the ASIC with additional functionality. It is preferred that a programmable cable modem ASIC be programmed to include pattern generator 52, addresser 54, cyclic redundancy check control 56 and measurement algorithm 58.

Figure 6:
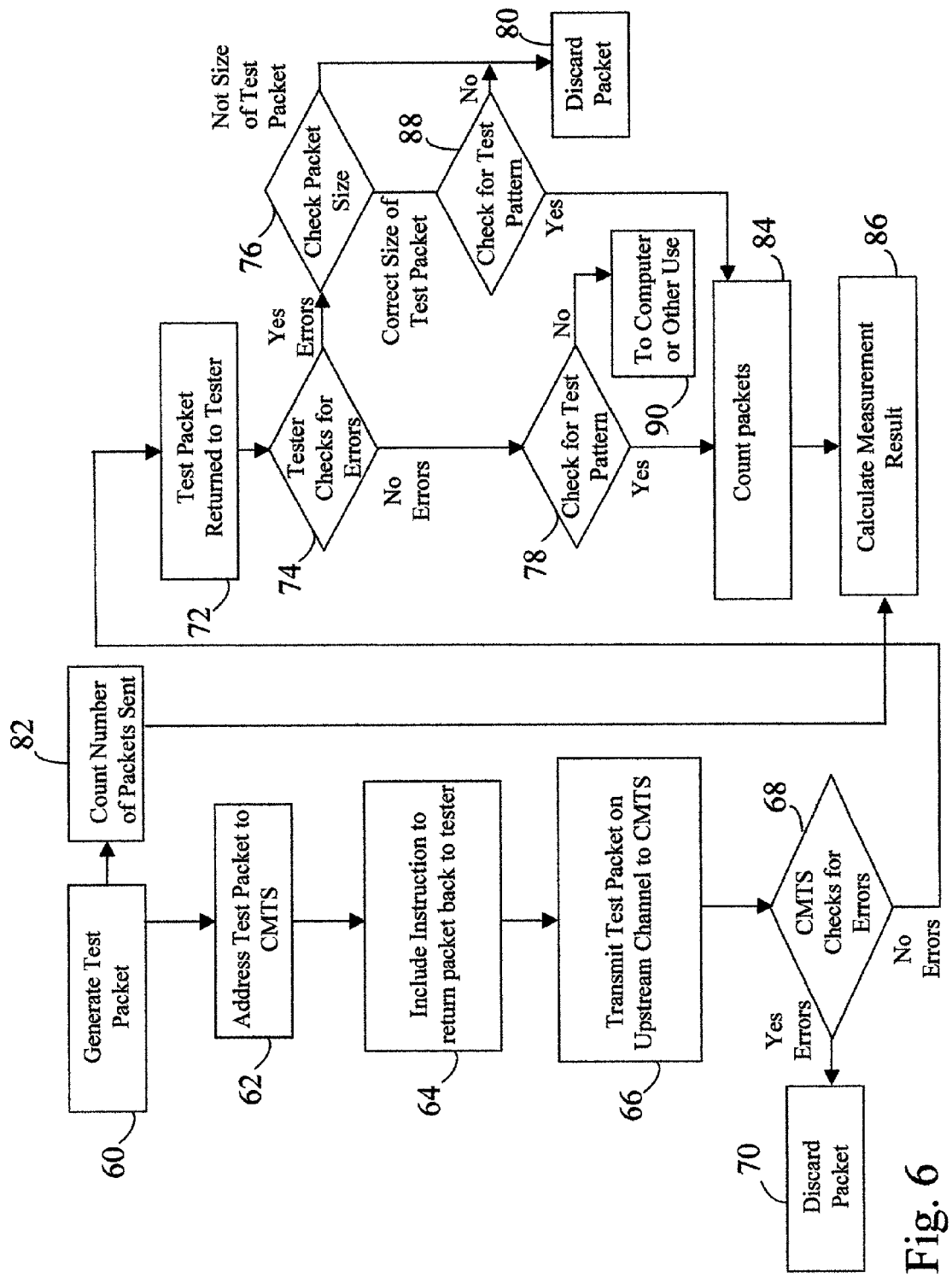
FIG. 6 is a flow chart of the method of the preferred embodiment of the present invention.

FIG. 6 illustrates a flow chart of the preferred embodiment for testing the upstream of the cable modem system. The preferred method runs continuously until stopped by an operator. The longer the method runs, the more accurate the result will be. The preferred method begins at step 60 where the method generates a test packet with a test pattern repeated multiple times throughout the packet. In step 62 the address of the CMTS is added to the packet. In step 64 an instruction is added to return the packet back to the tester once it has been received by the CMTS. In step 66 the packet is transmitted to the CMTS over the upstream channel. In step 68 the CMTS receives the packet and checks the packet for any errors using CRC. The CMTS does this to all packets it receives. If the packet contains errors it will be discarded in step 70 and no further action will be taken on this packet. If there are no errors in the packet, the CMTS returns the packet to the tester on the downstream channel.

In the method in step 74 the tester receives the packet and checks the packet using CRC for errors. If errors exist, the packet is then checked in step 76 for the number of bits in the packet. If the number of bits doesn't match the number of bits in a test packet, the packet is discarded. If the number of bits is the correct number of bits in a test packet, the CRC packet discard facility is bypassed and the packets are then checked for the test pattern in step 88. Since the test pattern is repeated multiple times throughout the packet, step 88 will not require that the test pattern be observed in all parts of the packet. Identifying the test pattern in one part of the packet will be sufficient. Other portions of the packet may have been corrupted by errors and so long as one portion of the pattern remains intact that is sufficient to identify the packet as a test packet and pass the packet on to step 84. This step is important because any errors in the packet at this point must have been caused by the downstream path, since errors in the upstream path would have resulted in the packet being discarded at the CMTS and never be returned. Because the errors must have been caused by the downstream this packet still needs to be counted in the measurement calculation in subsequent steps. If in step 74 the CRC found no errors, then the packet is tested for a test pattern in step 78. If this packet is a test packet it will have no errors so the entire test pattern should be intact. If the packet is identified to be a test packet in step 78, then it is passed to step 84. If it is not identified to be a test packet in step 78, it is passed to step 90 and used for other purposes such as a computer connected to the tester.

In the method in step 84 the packet is counted and added to the total number of packets received in this step over the measurement period. In step 86 the total number of packets counted in step 84 is compared to the number of packets originally transmitted and counted in step 82. These two pieces of information are used to calculate measurement results over a period of time. Any packets discarded by the CMTS in step 70 will reduce the count in step 84 when compared to the count in step 82. With the addition of a time factor the typical measurement results that are derived from the count in step 84 and step 82 are Block Error Rate (BkER) and Lost Packets.

It should be noted that the process described in FIG. 6 is a continuous process during the measurement period. Packets are continuously generated by the tester and received back from the CMTS and counted. While a possible embodiment is to wait for a packet to be received and counted before beginning transmission of a new packet, this is not the ideal case because a significant amount of time is required to send the packet to the CMTS and back. A preferred embodiment is to send the next packet as soon as allowed by the CMTS creating a stream of packets looping to the CMTS and back to be counted.

Referring to FIG. 6 another embodiment of this invention would be to completely bypass the CRC error checking and discarding in step 74 during any time a measurement is being made and simply pass all packets to step 78 regardless of whether errors exist. Step 78 would then check for the test pattern and the process would continue in the same fashion as in FIG. 6. The disadvantage of this embodiment is that the tester may also be used simultaneously for data communications with a computer or for other purposes. Not checking for CRC errors in step 74 during a measurement interval could pass errored packets on to the computer step 90, since there is no way to know at this point whether the packet was a test packet or a data packet destined for the computer or other use.

Referring to FIG. 6 another embodiment of this invention would be count the size of the packet prior to the CRC check 74, if the packet size matched the number of bits in a test packet, then pass the packet without a CRC check 74. The disadvantage of this method is that non-test packets of the same size as a test packet could be passed with errors to the computer step 90.

I claim:

1. A method for separately determining the performance of the upstream and downstream paths of a cable network, comprising:

transmitting from a tester, Internet Protocol (IP) test packets through a cable network to a Cable Modem Terminating System, wherein the IP test packets contain instructions to return the IP test packets back to the tester;

returning the IP test packets back to the tester from the Cable Modem Terminating System, wherein some of the returned IP test packets received at the tester without errors, and some of the returned IP test packets received at the tester with errors, as a result of the downstream patent;

bypassing error checking in the tester for the returned IP test packets received at the tester with the errors;

checking the IP test packets with the errors in the tester to identify the IP test packets with the errors as IP test packets;

determining if any of the IP test packets were lost in the upstream or downstream paths, wherein the determining of the downstream path is based on the IP test packets received at the tester with the errors, and the determining of the upstream path is based on the IP test packets not received at the tester; and determining over a measurement time period, performance test results of the upstream or downstream paths, based on the number of the IP test packets transmitted from the tester through the cable network to the Cable Modem Termination System compared to the number of IP test packets received at the tester with the errors and furthermore, based on the number of the IP test packets transmitted from the tester through the cable network to the Cable Modem Termination System compared to the number of IP test packets received at the tester without the errors.

2. The method in claim 1, wherein the performance test results are Block Error Rate.

3. The method in claim 1, wherein the performance test results are Lost Packets.

4. The method in claim 1, wherein the step of transmitting from the tester, transmits the IP test packets in the upstream channel of the cable network.

5. The method in claim 1, wherein the step of transmitting from the cable modem termination system, transmits the IP test packets in the downstream channel of the cable network.

6. The method in claim 1, wherein the process to check for errors is Cyclic Redundancy Check (CRC).

7. The method of claim 1, wherein the method repeats the process continuously during the measurement time period.

8. The method in claim 1, wherein the IP test packets contain a test pattern.

9. The method in claim 8, wherein the IP test packets are determined to be IP test packets by identifying a portion of the test pattern.

10. The method in claim 8, wherein errors in parts of the IP test packets are ignored if portions of the test packets contain a portion of the test pattern.

11. The method in claim 1, wherein the IP test packets are counted in the tester to determine if the test packets are the size of the test packets transmitted from the tester.

12. The method in claim 1, wherein the IP test packets contain an address of a destination other than the Cable Modem Termination System.

13. The method in claim 12, wherein the step of transmitting the IP test packets from the Cable Modem Termination System, the IP test packets are transmitted to the tester via the destination.

* * * * *

UNITED STATES PATENT AND TRADEMARK OFFICE
CERTIFICATE OF CORRECTION

PATENT NO. : 7,007,209 B2 Page 1 of 1
APPLICATION NO. : 10/083749
DATED : February 28, 2006
INVENTOR(S) : Richard Charles Jaworski It is certified that error appears in the above-identified patent and that said Letters Patent is hereby corrected as shown below:

Column 7,
Line 50, delete "patent" and insert --path--.

Signed and Sealed this

Eleventh Day of July, 2006

JON W. DUDAS
*Director of the United States Patent and Trademark Office*